US012208964B2

(12) United States Patent
Biondi et al.

(10) Patent No.: US 12,208,964 B2
(45) Date of Patent: Jan. 28, 2025

(54) FEED UNIT FOR ARTICLES

(71) Applicant: G.D S.P.A., Bologna (IT)

(72) Inventors: Andrea Biondi, Bologna (IT); Luca Cavazza, Bologna (IT); Umberto Zanetti, Bologna (IT); Enrico Campagnoli, Bologna (IT); Antonio Gigante, Bologna (IT)

(73) Assignee: G.D S.P.A., Bologna (IT)

( * ) Notice: Subject to any disclaimer, the term of this patent is extended or adjusted under 35 U.S.C. 154(b) by 0 days.

(21) Appl. No.: 17/998,310

(22) PCT Filed: Jul. 26, 2021

(86) PCT No.: PCT/IB2021/056704
§ 371 (c)(1),
(2) Date: Nov. 9, 2022

(87) PCT Pub. No.: WO2022/023921
PCT Pub. Date: Feb. 3, 2022

(65) Prior Publication Data
US 2023/0339687 A1 Oct. 26, 2023

(30) Foreign Application Priority Data
Jul. 29, 2020 (IT) .......................... 102020000018430

(51) Int. Cl.
*B65G 11/06* (2006.01)
*B65B 29/02* (2006.01)
*B65B 41/00* (2006.01)

(52) U.S. Cl.
CPC .......... *B65G 11/063* (2013.01); *B65B 29/022* (2017.08); *B65B 41/00* (2013.01)

(58) Field of Classification Search
CPC ................ B65G 11/063; B65G 47/248; B65G 2201/022; B65B 29/022; B65B 41/00
(Continued)

(56) References Cited

U.S. PATENT DOCUMENTS 3,029,918 A * 4/1962 Stover ..................... B67B 3/064
193/46
4,458,801 A * 7/1984 Nichols ................ B65G 11/063
221/172
(Continued)

FOREIGN PATENT DOCUMENTS

BE 763927 A 8/1971
GB 1296189 A 11/1972
(Continued)

OTHER PUBLICATIONS

Anonymous: Sunjuly Coffee Capsule Holder Sunjuly Twist Spiral 50 Capsules Coffee Pad Holder Tower Stand Rack for Nespresso / Dulce Gusto: Amazon:de: Kuche & Hausthalt, Amazon.de, Nov. 28, 2019 (Nov. 28, 2019), pp. 1-3, XP055791638, Retrieved from the Internet: website: amazon.de/-/en/SUNJULY-Capsule-Sunjuly-Capsules-Nespresso/dp/B0823ZKZ4Y.
(Continued)

*Primary Examiner* — Mark A Deuble
(74) *Attorney, Agent, or Firm* — Steinfl + Bruno LLP

(57) ABSTRACT

A feed unit for articles includes a guide extending along a guide longitudinal axis to define a linear feed path for such articles. The guide is for accommodating articles arranged in a row one after the other and to guide the articles as the articles move along the linear feed path. The articles have a characteristic length corresponding to their size along the longitudinal axis. At least one segment of the guide is progressively rotated about the guide longitudinal axis by a total angle greater than 180° and with an angular variation per unit of linear measurement such that, substantially for each portion of the linear feed path equal to the characteristic length of the articles, the guide is rotated about the longitudinal axis by an angle greater than 4°.

13 Claims, 3 Drawing Sheets

(58) Field of Classification Search
USPC .......................... 198/389–390, 417; 193/46
See application file for complete search history.

(56) References Cited

U.S. PATENT DOCUMENTS

| | | | | |
|---|---|---|---|---|
| 4,469,229 A | * | 9/1984 | Cronan | ................. B65G 47/24 |
| | | | | 198/417 |
| 4,641,672 A | * | 2/1987 | Lewbart | ................ A47L 15/245 |
| | | | | 198/402 |
| 5,297,668 A | | 3/1994 | Zink | |
| 5,609,237 A | * | 3/1997 | Lenhart | ................ B65G 47/248 |
| | | | | 198/417 |
| 7,455,166 B2 | * | 11/2008 | Seiffert | ................ B65B 39/007 |
| | | | | 193/46 |

FOREIGN PATENT DOCUMENTS

| | | |
|---|---|---|
| JP | H0289722 A | 3/1990 |
| WO | 2022/023921 A1 | 2/2022 |

OTHER PUBLICATIONS

International Search Report and Written Opinion for PCT/IB2021/056704 filed on Jul. 26, 2021 in the name of G.D S.P.A., mailed on Oct. 19, 2021. 13 pages.

\* cited by examiner

FEED UNIT FOR ARTICLES

CROSS REFERENCE TO RELATED APPLICATIONS

The present application is the US National Stage of International Patent Application No. PCT/IB2021/056704, filed internationally on Jul. 26, 2021, which, in turn, claims priority to Italian Application No. IT 102020000018430, filed on Jul. 29, 2020.

The present invention relates to a feed unit for articles conducted into a guide. It is also directed to a method of avoiding packings of articles conducted within a guide.

The present invention finds a preferred, though not exclusive, application in the field for preparing and packaging food and non-food products, an example of which is represented by the capsules for infusion type beverages, e.g. coffee, a product to which reference will be made below without loss of generality.

In particular, in this technical field, packaging apparatuses are known in which a plurality of containers are individually filled with the product to be packaged, for example coffee powder, and then, after being closed by a special membrane, are sent to the final steps of boxing and packaging.

In some types of capsules, it is common practice to provide a protection disc between the bottom of the container and the filter enclosing the product to be packaged (e.g. the coffee powder) to prevent the filter from being accidentally punctured during the step of preparing the beverage.

These protection discs are usually inserted into the still empty containers before the filter is inserted in the container and filled with the product to be packaged.

In this description as well as in the accompanying claims, certain terms and expressions are deemed to have, unless otherwise expressly indicated, the meaning expressed in the following definitions.

The term "article" means any object apt to be moved along a guide.

The articles can be identical to each other, or they can differ from each other in some characteristics such as the formation, the composition or the colour. The formation of an article is called "slab shaped", when the article has two prevalent dimensions, which can be defined as the length and the width of the article, and a third dimension substantially smaller than the other two dimensions, which can be defined as the thickness of the article. The slab shaped article can be flat or curved.

The articles are arranged in the guide "one after the other" when they are positioned in a row without any substantial interruption. In other words, the articles are generally in a row one next to each other, in contact with each other, without excluding the possibility of a slight and temporary distancing between the articles during the movement thereof along the guide.

A "guide" is a mechanical member which is provided to allow the sliding of the articles inside it between a departure section and an arrival section along a substantially linear path, which in turn can be rectilinear or curved and develop in three-dimensional space.

Preferably, the guide extends along a prevalent longitudinal direction, which allows defining a longitudinal axis of the guide and defines the linear path of the articles between the departure and arrival sections.

Preferably, the guide is provided to keep the articles in a predetermined spatial orientation while sliding along the linear path.

A segment of a guide is said to be "twisted" when in that segment the guide is rotated substantially progressively about its longitudinal axis. In other words, in this segment, the orientation of the cross section of the guide varies as the position along its longitudinal axis varies, so that each cross section is angularly offset with respect to the sections immediately preceding or following it.

The rotation of the guide about its longitudinal axis may be constant along the development of its longitudinal axis, that is, the angular offset between cross sections remains constant for the same spacing along the longitudinal axis, that is, it can be variable. In particular, the rotation of the guide can also change direction or, for small portions of the guide, also be zero.

A characteristic is present in a "substantially the totality" of a guide or a segment thereof, when that characteristic is present on at least 90%, more preferably on at least 95%, and even more preferably on at least 99% of the extent of the guide or of the segment thereof.

An "packing of articles" along a guide indicates a condition of limitation of the sliding of the articles caused by at least the partial flanking of two articles that tend to get jammed with the walls of the guide, even to be blocked inside the guide, consequently also blocking the articles that follow them.

The Applicant has observed that articles conducted within a guide one after the other along a linear advance path may be subject to packing phenomena. This drawback causes obstruction of the guide with consequent blocking of the sliding of the articles along the guide.

The Applicant has also observed that this undesirable phenomenon is generally caused by an at least partial flanking of two consecutive articles, which causes them to get jammed between the walls of the guide.

The Applicant has also verified that this drawback is particularly pronounced when high productivity is required of the feed unit, i.e. it is required to feed a high number of articles per unit of time.

In particular, the Applicant has in fact noted that in this case the articles are conducted along the guide at high speed and, moreover, it is necessary that the number of articles inside the guide is high in order to ensure the feeding continuity for an adequate period of time, and has also noted that both these conditions favour the possibility that an article gets wedged between the article preceding it and the walls of the guide, getting jammed and causing the blockage of the sliding along the guide.

In an attempt to solve this problem, the Applicant has preliminarily attempted to minimise the clearances between the walls of the guide and the articles that have to be moved along it.

However, the Applicant has verified that this solution had a number of limitations that undermined its effective application in some important cases. In particular, the Applicant has ascertained that at a curve of the guide it is necessary that the spacing between the article and the walls of the guide is kept at a sufficiently high measurement to allow the article, which is generally rigid, to make the curve without getting jammed.

In addition, the provision of too little clearances is not compatible with the feeding on the guide of articles that may have appreciable dimensional tolerances.

The Applicant has therefore perceived that the possibility of at least partial flanking between consecutive articles, which is the main cause of the packing phenomena of the feed on guides, could be avoided by appropriately orienting an article with respect to the articles preceding and following it.

Finally, the Applicant has found that a guide which in at least one segment thereof is twisted about its longitudinal axis with a suitable angular variation is capable of staggering the consecutive articles conducted on this segment between them in such a way as to preclude the possibility that a following article may even partially flank the preceding article.

In other words, the Applicant has found that with a guide thus provided each article, seen from the longitudinal axis of the guide, is rotated by a certain angle with respect to the article that precedes it, which necessarily increases the overall dimensions in section of the two consecutive articles.

Thus, in a first aspect thereof, the present invention is directed to a feed unit for articles comprising a guide extending along a longitudinal axis thereof to define a linear feed path for said articles.

Preferably, said guide is provided to accommodate a plurality of said articles arranged in a row one after the other and to guide them as they move along said linear feed path.

Preferably, said articles have a characteristic length corresponding to the size of each of said articles measured along said longitudinal axis.

Preferably, at least one segment of said guide is rotated progressively about said longitudinal axis by a total angle greater than 180°.

Preferably, at least one segment of said guide is rotated progressively about said longitudinal axis with an angular variation per unit of linear measurement such that, in substantially the totality of said segment, for each portion of said linear path equal to said characteristic length, said guide is rotated about said longitudinal axis by an angle greater than 4°.

Thanks to these characteristics, each article is oriented staggered from the article that precedes it, so that the space required to be able to flank it even partially becomes considerably greater than the mere thickness of the article. In this way, jams between successive articles are prevented, strongly limiting, if not completely eliminating, the possibility of packing of articles along the guide.

In a second aspect thereof, the present invention is directed to a method to avoid a condition of packing of articles conducted along a guide.

Preferably, said guide extends along a longitudinal axis thereof defining a linear feed path for said articles.

Preferably, said method comprises the step of providing a plurality of said articles in a row one after the other within said guide.

Preferably, said method comprises the step of identifying a characteristic length of said articles, corresponding to the size of each of said articles measured along said longitudinal axis.

Preferably, said method comprises the step of providing that said guide, for at least a segment thereof, is progressively rotated about said longitudinal axis with an angular variation per unit of linear measurement such that, in substantially the totality of said segment, for each portion of said linear path equal to said characteristic length of said articles, said guide is rotated about said longitudinal axis by an angle greater than 4°.

Preferably, said method comprises the step of moving said articles within said guide.

Thanks to the characteristics of the method of the invention, the articles are guided along the guide without incurring unwanted packing, consequently increasing the reliability of the feeding process.

In a third aspect thereof, the present invention is directed to an apparatus for preparing food products comprising a plurality of containers and a feed unit for articles intended to be coupled to said containers, wherein said feed unit is constructed according to the first aspect.

In at least one of the aforesaid aspects, the present invention may also have at least one of the preferred features set out below.

In some embodiments, for each portion of said linear path equal to said characteristic length, said guide, in said at least one segment thereof, is rotated about said longitudinal axis by an angle of less than 30°.

In this way, excessive resistances to the sliding of the articles along the guide are avoided which can become a limiting factor particularly in the case of high movement speeds of the articles.

In addition, the Applicant has noted that the greater the angular variation per unit of linear measurement, the larger the segment of the guide with respect to the articles must also be, resulting in increased clearances and reduced stability of the articles when sliding, particularly at high speeds.

Preferably, for each portion of said linear path equal to said characteristic length, said guide, in said at least one segment thereof, is rotated about said longitudinal axis by an angle between 4° and 20°, more preferably between 5° and 10°.

Within these ranges of angular variation per unit of linear measurement, the best balancing of the opposing requirements of guide stability during sliding and effective staggering action between consecutive articles is obtained.

In one embodiment, said at least one segment of said guide is progressively rotated about said longitudinal axis by a total angle greater than 360°, more preferably greater than 540°.

In a preferred embodiment, said angular variation per unit of linear measurement is constant within said at least one segment of said guide.

In a preferred embodiment, said at least one guide segment represents more than 90% of the length of the guide, more preferably it represents more than 95% of the length of the guide.

In one embodiment, said at least one segment of the guide measures at least one metre in length, more preferably at least two metres.

Preferably, said at least one guide segment has a length greater than 30 times said characteristic length of said articles.

Preferably, said guide has a difference in height between an inlet station and an outlet station of said articles greater than 20 cm.

In one embodiment, said guide comprises retention walls apt to retain said articles within said guide.

In this way, the articles are kept within the guide as they slide along the linear path defined by the guide.

Preferably, said retention walls have a clearance with said articles between 0.5 and 5 mm.

In one embodiment, said at least one guide segment comprises at least one curve of said linear feed path.

Preferably, said at least one curve has a radius of curvature between 20 and 50 cm.

In one embodiment, on said guide, movement devices are provided which are provided to push said articles along said linear feed path.

Preferably, said movement devices comprise a plurality of nozzles which are connected to a pneumatic circuit and arranged along said linear feed path to deliver a jet of air to said articles.

In one embodiment, said articles have a slab shape, wherein two prevalent dimensions are identified, defining a length and a width of said article, and a third dimension substantially smaller than said two dimensions is identified, defining a total thickness of said article.

Preferably, said articles are positioned in said guide in such a way that said longitudinal axis is substantially parallel to one of said two prevalent dimensions.

In some embodiment, said characteristic length of said articles, e.g. one of said prevalent dimensions, is between 10 mm and 100 mm, preferably between 20 mm and 70 mm and even more preferably between 30 mm and 40 mm.

Preferably, said articles have a curved shape with a substantially constant thickness.

In one embodiment, said thickness of said articles is between 1 mm and 3 mm.

Preferably, said articles are fed at a speed greater than 500 articles per minute, more preferably, greater than 1000 articles per minute and even more preferably greater than 1200 articles per minute.

Preferably, said articles arranged in a row one after the other within said guide are more than 50, more preferably more than 80.

Preferably, said articles are protection discs to be deposited inside said containers.

In another embodiment, said articles are lids with which to close the containers.

Preferably, said containers are capsules for infusion type beverages.

The characteristics and advantages of the invention will become clearer from the detailed description of an embodiment example illustrated, by way of non-limiting example, with reference to the appended drawings wherein.

Figure 1:
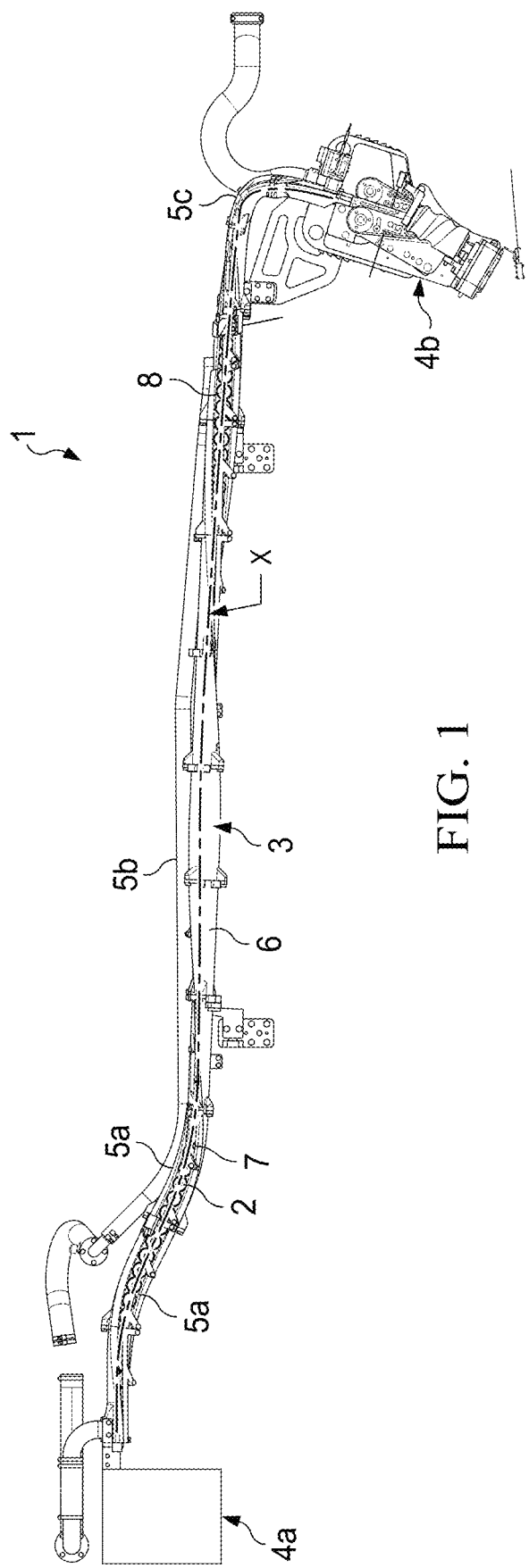
FIG. 1 is a schematic view in side perspective of a feed unit for articles made in accordance with the present invention.
Figure 2:
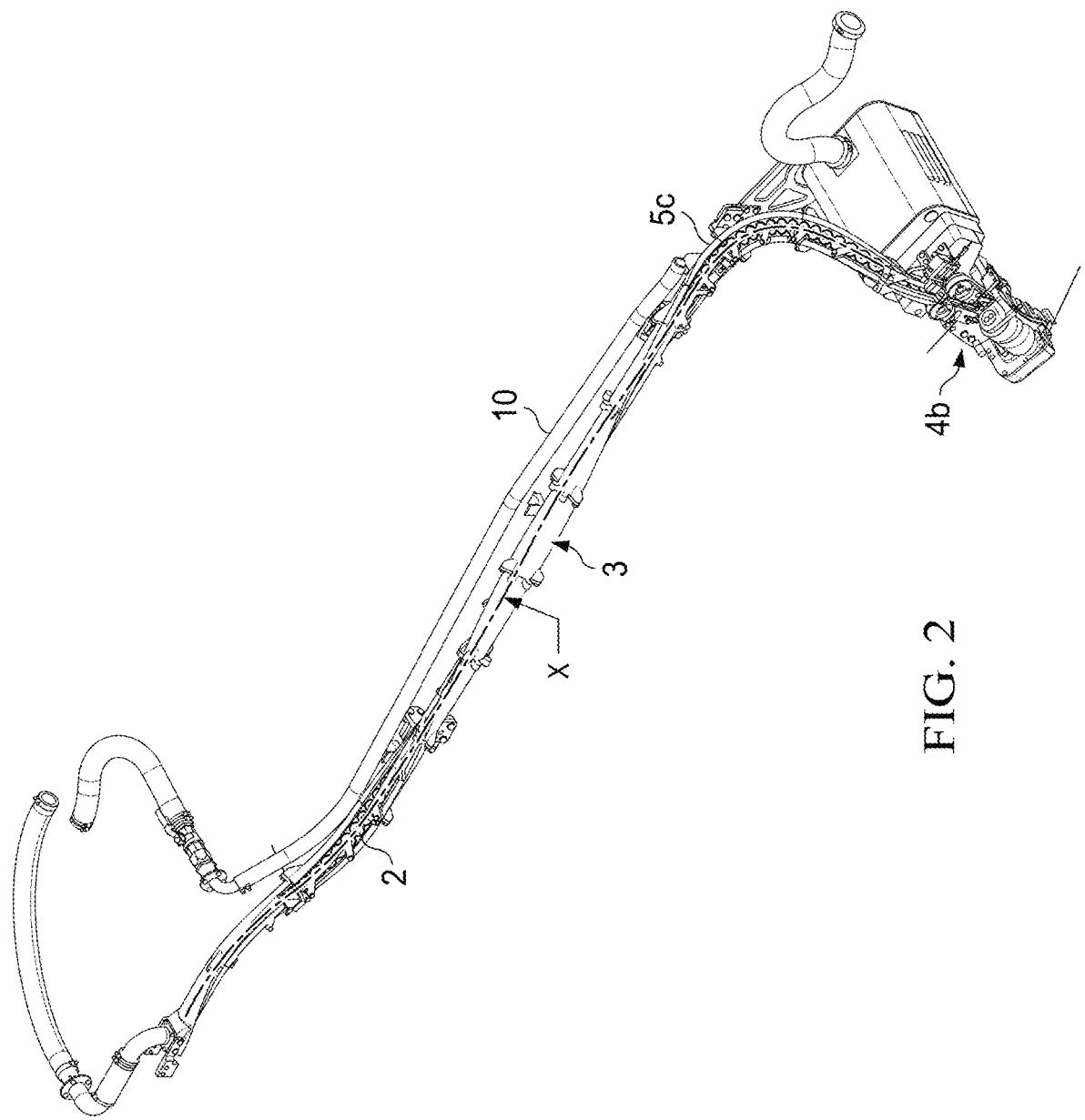
FIG. 2 is a schematic view from above of the feed unit in FIG. 1.
Figure 3:
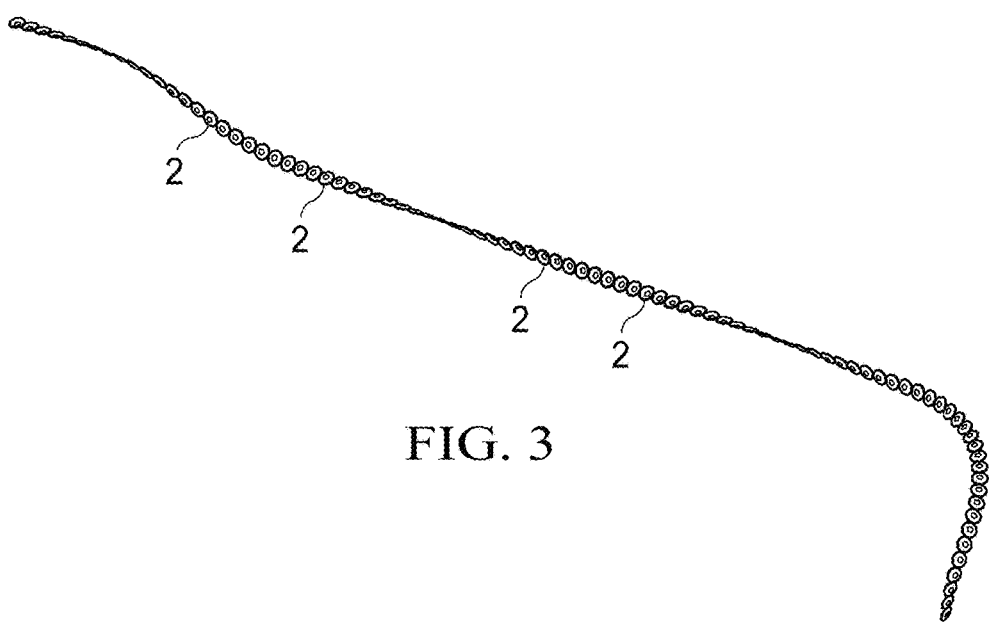
FIG. 3 is a schematic representation of the arrangement of the articles conducted within the feed unit of FIG. 2.
Figure 4:
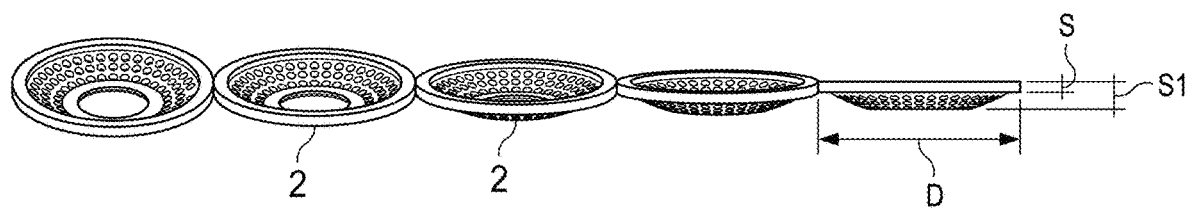
FIG. 4 is a side view on enlarged scale of some of the articles represented in FIG. 3.

With reference to the accompanying figures, 1 indicates overall a feed unit for articles 2 constructed in accordance with the present invention.

In the embodiment example described herein, the feed unit 1 is inserted within an apparatus for preparing and packaging capsules for infusion type beverages, in particular coffee, and is provided to feed a plurality of protection discs at the bottom of respective empty capsules prior to their filling with coffee powder.

The articles 2 are then formed by the protection discs.

The latter have a slab shape, with a large central hole and a plurality of small holes evenly that are distributed throughout the rest of the surface. The protection discs are identical between them and have a circular shape with a diameter D of about 30 to 40 mm and a thickness S of about 1 to 3 mm, which is substantially constant.

The discs also have a slightly convex shape, so that the total thickness S1 of the articles 2 defines a footprint of about 3 to 6 mm.

In the articles 2, there are therefore two prevalent dimensions, measuring equal to the diameter D, and a third dimension with a significantly lower measurement corresponding to the total thickness S1 of the article.

The feed unit 1 comprises a guide 3 in which the articles 2 are arranged in a row one after the other to be moved and guided between an inlet station 4a and an outlet station 4b.

In particular, the inlet station 4a (shown schematically only in FIG. 1) comprises a first delivery device (e.g. of the ball feeder type) in which the articles 2 introduced in bulk are fed in an orderly manner and with a predefined orientation within the guide 3, while the outlet station 4b comprises a second delivery device which is provided to supply the articles 2 to a working unit in which the articles are inserted one by one into respective empty capsules.

The guide 3 extends along a longitudinal axis X thereof, to define a linear feed path for the articles 2, which extends for a length of about 3-4 metres, with a difference in height of about 20 cm, passing through a pair of curves 5a, with a wide radius, a central segment 5b substantially rectilinear and a curve 5c with a short radius. The latter, in particular, has a radius of curvature of about 30 cm, which is about 10 times the diameter of an article 2.

The guide 3 is delimited by a bottom wall 6, by a pair of flanks 7 rising from sides of the bottom 6 and by a bar 8 extending parallel to the flanks 7 on opposite sides to the bottom 6, which together form retention walls for the articles 2 accommodated within the guide 3. In particular, the retention walls delimit a chamber of substantially rectangular cross section in which the articles 2 are accommodated with a clearance between 0.5 and 5 mm.

The articles 2 are positioned in the guide 3 resting on the bottom 6, so that their diameter is substantially parallel to the longitudinal axis X. In this arrangement, the articles 2 have a characteristic length, i.e. a length measured parallel to the longitudinal axis X, substantially equal to their diameter.

Figure 6:
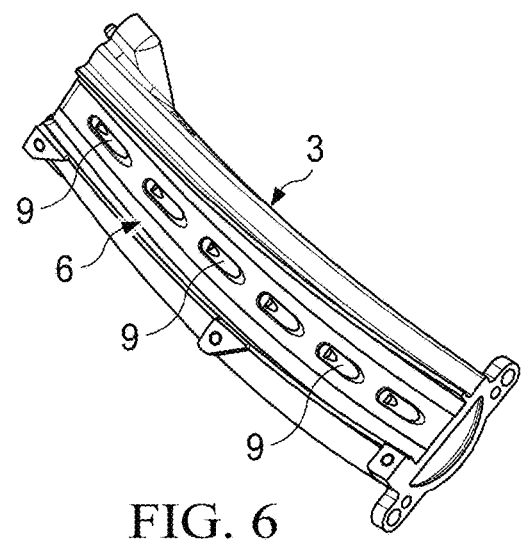
FIG. 6 is a schematic perspective view of a detail of the feed unit of FIG. 1.

The articles 2 are conducted as they slide along the guide 3 by the gravitational force and by a plurality of nozzles 9 connected to a pneumatic circuit 10 and arranged in steps at the bottom of the guide 3 to deliver a jet of air towards the articles 2 and to push them along the linear feed path (see FIG. 6).

The articles 2 accommodated within the guide 3 are about 100 and are conducted as they slide inside the same at a speed such as to deliver about 1500 per minute.

In order to avoid phenomena of packing of the articles 2, also due to their formation, the configuration of the linear feed path and the speed with which they are guided along this path, the guide 3 is advantageously twisted about the longitudinal axis X, so as to assume a spiral configuration.

In particular, the entire guide 3 is continuously rotated about its longitudinal axis X with a substantially constant angular variation per unit of linear measurement and such that for each guide segment of a length equal to the diameter of the articles 2 (i.e. their characteristic length) the guide is rotated by an angle A of about 7°.

Figure 5:
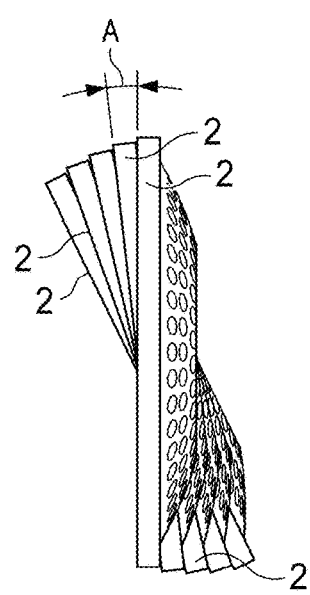
FIG. 5 is a front view of the articles in FIG. 4.

In this way, each article 2 conducted along the guide 3 is angularly staggered by about 7° with respect to the article preceding it and by further 7° with respect to the article following it, as clearly shown in FIG. 5.

Thanks to this characteristic, it is substantially prevented that an article 2 can be placed side by side even only partially with the article 2 that precedes it. In consideration of the length of the guide 3 and of the angular variation per unit of linear measurement defined above, the guide 3 is rotated about its own longitudinal axis by a total angle which is much greater than 180°, equal to about 650°. Naturally, by maintaining the same angular variation per unit of linear measurement, the total angle of rotation will vary as a function of the overall length of the guide 3.

The feed unit 1 then continuously receives the articles 2 at the inlet station 4a and receives them inside the guide 3 where they are arranged in a row one after the other, where, pushed by the gravitational force and the action of the nozzles 9, they quickly slide towards the outlet station 4b.

Along the linear feed path, the articles 2 travel descents, rectilinear and curved segments, always continuing to rotate about the longitudinal axis X following the spiral trajectory defined by the twisted guide 3.

Thanks to these characteristics, the articles 2 are conducted along the guide 3 in a safe and continuous way without incurring packing along the path.

The invention claimed is:

1. An apparatus for preparing food products, comprising
   a plurality of containers, and
   a feed unit comprising a guide with at least one guide segment and a plurality of articles,
   wherein:
   the guide extends along a guide longitudinal axis to define a linear feed path for said articles,
   the guide is configured to accommodate a plurality of said articles arranged in a row one after the other and to guide the articles as the articles move along said linear feed path, said articles having a characteristic length corresponding to a size of each of said articles measured along said guide longitudinal axis,
   the at least one guide segment is configured to progressively rotate about said longitudinal axis by a total angle greater than 180° and with an angular variation per unit of linear measurement such that, for substantially the entirety of said at least one guide segment, for each portion of said linear feed path equal to said characteristic length, said guide is configured to rotate about said longitudinal axis by an angle greater than 4°, and
   the articles are configured to be coupled to said plurality of containers.

2. The apparatus for preparing food products according to claim 1, wherein for each portion of said linear path equal to said characteristic length, said guide, in said at least one guide segment, is configured to rotate about said longitudinal axis by an angle of less than 30°.

3. The apparatus for preparing food products according to claim 1, wherein for each portion of said linear path equal to said characteristic length, said guide, in said at least one guide segment, is configured to rotate about said longitudinal axis by an angle between 4° and 20°.

4. The apparatus for preparing food products according to claim 1, wherein said at least one guide segment is configured to progressively rotate about said longitudinal axis by a total angle greater than 360°.

5. The apparatus for preparing food products according to claim 1, wherein said angular variation per unit of linear measurement is constant within said at least one guide segment.

6. The apparatus for preparing food products according to claim 1, wherein said at least one guide segment comprises at least one curve of said linear feed path.

7. The apparatus for preparing food products according to claim 1, further comprising, on said guide, movement devices to push said articles along said linear feed path.

8. The feed unit according to claim 7, wherein said movement devices comprise a plurality of nozzles connected to a pneumatic circuit and arranged along said linear feed path to deliver a jet of air to said articles.

9. A method for preventing packing of articles conducted along a guide with at least one guide segment, the articles extending along a longitudinal axis of the guide that defines a linear feed path for said articles, the method comprising:
   providing a plurality of said articles in a row, one after the other, on said guide,
   identifying a characteristic length of said articles corresponding to a size of each of said articles measured along said longitudinal axis,
   progressively rotating said guide, for the at least one guide segment, about said longitudinal axis by a total angle greater than 180° and with an angular variation per unit of linear measurement such that, for substantially the entirety of said segment, for each portion of said linear path equal to said characteristic length of said articles, said guide rotates about said longitudinal axis by an angle greater than 4°,
   moving said articles on said guide, and
   coupling said articles to a plurality of containers.

10. The method according to claim 9, wherein for each portion of said linear path equal to said characteristic length, said guide, in said at least one guide segment, is rotated about said longitudinal axis by an angle between 4° and 20°.

11. The method according to claim 9, wherein in said at least one guide segment, said linear feed path comprises a curve.

12. The method according to claim 9, wherein said articles have a slab shape, the method comprising:
   identifying two prevalent dimensions, defining a length and a width of said article,
   identifying a third dimension substantially smaller than said two dimensions, defining a total thickness of said article, and
   positioning said articles in said guide so that said longitudinal axis is substantially perpendicular to said third dimension.

13. The method according to claim 9, wherein said articles have a curved shape with a substantially constant thickness.

* * * * *